US009010279B1

(12) United States Patent
Saber et al.

(10) Patent No.: US 9,010,279 B1
(45) Date of Patent: Apr. 21, 2015

(54) LEASH SYSTEM AND METHOD OF USE

(75) Inventors: Michael A. Saber, Denver, CO (US); Joseph A. Buescher, Littleton, CO (US)

(73) Assignee: Chilkoot Trail Ventures, LLC, Littleton, CO (US)

( * ) Notice: Subject to any disclaimer, the term of this patent is extended or adjusted under 35 U.S.C. 154(b) by 305 days.

(21) Appl. No.: 12/871,609

(22) Filed: Aug. 30, 2010

(51) Int. Cl.
*A01K 27/00* (2006.01)

(52) U.S. Cl.
CPC ................... *A01K 27/003* (2013.01)

(58) Field of Classification Search
CPC ........ A45C 11/32; A45C 7/02; A45C 7/0086; A01K 15/00; A01K 27/00; A01K 27/003; A01K 27/008
USPC ......... 119/769, 702, 703, 704, 705, 706, 707, 119/708, 174, 795; 292/137, 138, 145, 163, 292/174, 175, 336.3, 252; 70/207–210, 70/213–214, 456 R, 457, 458, 459, 456 B; 220/755–757, 765, 752; 24/598.7, 24/599.1, 601.5; 16/444, 426, 428, 430; 294/137, 146, 159, 162, 167, 169
See application file for complete search history.

(56) References Cited

U.S. PATENT DOCUMENTS

| 530,116 | A | | 12/1894 | Murphy | |
|---|---|---|---|---|---|
| 1,367,043 | A | * | 2/1921 | Haskell | 190/101 |
| 1,710,734 | A | * | 4/1929 | Johnson | 63/13 |
| 2,361,069 | A | * | 10/1944 | Steinhardt | 70/459 |
| 2,416,621 | A | * | 2/1947 | Gretschel | 190/101 |
| 2,493,245 | A | | 1/1950 | Hansen | |
| 2,505,400 | A | * | 4/1950 | Hinds | 292/288 |
| 2,717,171 | A | * | 9/1955 | Gottstein | 294/166 |
| 3,049,352 | A | | 8/1962 | Hancock | |
| D197,655 | S | | 3/1964 | Kuhn et al. | D34/15 |
| 3,428,036 | A | | 2/1969 | Parker | 124/5 |
| 3,589,349 | A | | 6/1971 | Parker | 124/5 |
| 3,841,292 | A | | 10/1974 | Hoffman | 124/5 |
| 3,898,765 | A | | 8/1975 | Lee | 46/81 |
| D244,628 | S | | 6/1977 | Wright | |
| 4,030,472 | A | | 6/1977 | Watkins | |
| D249,815 | S | | 10/1978 | Huelskamp | D21/722 |
| 4,222,562 | A | | 9/1980 | Gardner | |
| 4,302,900 | A | | 12/1981 | Rayner | |
| 4,364,371 | A | | 12/1982 | Woolard | 124/5 |
| 4,549,521 | A | | 10/1985 | Hargrave, Jr. | 124/5 |
| 4,850,927 | A | | 7/1989 | Caranica | |
| 4,879,882 | A | * | 11/1989 | Johnson et al. | 63/4 |
| 5,033,743 | A | | 7/1991 | Wright | |
| 5,129,650 | A | | 7/1992 | Hayman | 273/77 |

(Continued)

OTHER PUBLICATIONS

Office Action issued in related U.S. Appl. No. 12/860,703, dated Apr. 2, 2014 (20 pgs).

*Primary Examiner* — Monica Williams
*Assistant Examiner* — Joshua Huson
(74) *Attorney, Agent, or Firm* — Hayes Soloway P.C.

(57) ABSTRACT

A multi-function pet leash system generally comprises a substantially rigid handle and a substantially rigid tether/carrier engaged with the handle. The tether/carrier may have one or more means for removable tethering and carrying of accessories, whereby with a pet attached to a leash engaged with the tether/carrier, a user may grasp the handle coupled to the leash through the tether/carrier and walk the pet while conveniently carrying one or more accessories. The handle may be disengaged from the tether/carrier and so serve a separate function, alone or in combination with one or more of the accessories.

13 Claims, 10 Drawing Sheets

(56) References Cited

U.S. PATENT DOCUMENTS

| | | | |
|---|---|---|---|
| 5,207,420 A | 5/1993 | Crawford et al. | |
| 5,270,909 A * | 12/1993 | Weiss et al. | 362/208 |
| D348,915 S | 7/1994 | Fraser | |
| 5,363,680 A * | 11/1994 | Wu | 70/456 R |
| 5,399,136 A | 3/1995 | Bart | 482/110 |
| 5,433,494 A * | 7/1995 | Du Buisson | 294/165 |
| D363,752 S | 10/1995 | Shumber et al. | D21/236 |
| D367,504 S | 2/1996 | Barzani | |
| 5,580,157 A * | 12/1996 | Patricca et al. | 362/191 |
| 5,697,660 A * | 12/1997 | Smetz | 294/137 |
| D400,620 S | 11/1998 | Barton, Jr. | D21/713 |
| 5,836,176 A * | 11/1998 | Lichtenstein et al. | 63/13 |
| D408,482 S | 4/1999 | Morrison | |
| 5,904,388 A * | 5/1999 | Seibel | 294/163 |
| D411,269 S | 6/1999 | Albarelli, Jr. | |
| 6,003,470 A | 12/1999 | Budman | 119/711 |
| D418,880 S | 1/2000 | Albarelli, Jr. | |
| D421,078 S | 2/2000 | Weiss, Jr. | |
| 6,024,054 A | 2/2000 | Matt et al. | |
| 6,048,283 A | 4/2000 | Albarelli, Jr. | |
| D424,640 S | 5/2000 | Oblack | D21/722 |
| 6,076,829 A | 6/2000 | Oblack | 273/317 |
| 6,101,684 A * | 8/2000 | Ginocchio | 24/16 R |
| 6,220,980 B1 | 4/2001 | Adler | |
| 6,240,881 B1 | 6/2001 | Edwards et al. | |
| D468,378 S | 1/2003 | Routzong | |
| 6,651,590 B2 | 11/2003 | Willinger et al. | |
| 6,736,765 B2 | 5/2004 | Wallace et al. | 482/106 |
| D498,799 S | 11/2004 | Kerry | D21/662 |
| D505,233 S | 5/2005 | Viola | D30/160 |
| 6,896,578 B2 | 5/2005 | Shaw | 446/490 |
| 6,932,027 B1 | 8/2005 | Whitney | |
| D511,029 S | 10/2005 | Willinger | D30/160 |
| 7,032,583 B1 | 4/2006 | Hall | 124/5 |
| 7,044,080 B2 * | 5/2006 | Rabello | 119/61.56 |
| 7,047,604 B2 * | 5/2006 | Axel | 24/599.1 |
| 7,073,462 B1 | 7/2006 | Layman | |
| D545,509 S | 6/2007 | Wang | D30/160 |
| D549,889 S | 8/2007 | Winkler et al. | |
| D553,809 S | 10/2007 | Gick | |
| D554,717 S | 11/2007 | McKinnell et al. | D21/722 |
| 7,326,122 B2 | 2/2008 | Park | 473/256 |
| 7,533,916 B2 * | 5/2009 | Eichenbaum | 294/159 |
| D599,963 S | 9/2009 | Crane et al. | |
| 7,686,001 B2 | 3/2010 | Fitt | |
| D623,247 S | 9/2010 | Zawitz | D21/707 |
| D624,251 S | 9/2010 | Rutherford | D30/160 |
| D637,248 S | 5/2011 | Levin et al. | D21/722 |
| D640,018 S | 6/2011 | Rutherford | D30/160 |
| 8,001,656 B2 * | 8/2011 | Ramsauer | 16/416 |
| 8,104,145 B1 * | 1/2012 | Hajianpour | 16/428 |
| 8,312,844 B2 | 11/2012 | Mann | |
| 2004/0029656 A1 | 2/2004 | Vannoy | 473/505 |
| 2005/0211185 A1 * | 9/2005 | Jenkins et al. | 119/708 |
| 2006/0027187 A1 | 2/2006 | Nicastro | |
| 2006/0087139 A1 * | 4/2006 | Ayres | 294/137 |
| 2006/0162675 A1 | 7/2006 | Ghalebi et al. | |
| 2006/0207522 A1 * | 9/2006 | Perkitny | 119/796 |
| 2007/0056144 A1 * | 3/2007 | Vidal | 16/430 |
| 2007/0062005 A1 * | 3/2007 | Beruscha et al. | 16/422 |
| 2007/0062013 A1 * | 3/2007 | Mueller | 24/599.1 |
| 2007/0207871 A1 | 9/2007 | Traub | |
| 2008/0006223 A1 | 1/2008 | Sugalski | |
| 2009/0178520 A1 * | 7/2009 | Engelfried et al. | 81/489 |
| 2010/0024741 A1 | 2/2010 | Schoppman | |
| 2010/0150694 A1 * | 6/2010 | Zhang | 414/800 |
| 2011/0083617 A1 * | 4/2011 | Townsend et al. | 119/797 |
| 2011/0185980 A1 | 8/2011 | Chefetz et al. | 119/709 |
| 2012/0042486 A1 * | 2/2012 | Dunn et al. | 24/599.1 |
| 2012/0103277 A1 * | 5/2012 | Klein | 119/770 |
| 2013/0074780 A1 | 3/2013 | Wechsler | |

* cited by examiner

LEASH SYSTEM AND METHOD OF USE

BACKGROUND OF THE INVENTION

1. Field of the Invention

Aspects of this invention relate generally to leashes, and more particularly to multi-function leash systems.

2. Description of Related Art

By way of background, when a pet owner takes their dog or other animal out for a walk, he or she often desires to carry along, in addition to the leash itself, such items as keys, a cell phone, "doggie doo" bags, mace, a whistle, and various toys for play with the pet, depending on the type and length of the outing. While a variety of holders for some of these items have been proposed in the art, even somehow incorporated into a part of the leash or its handle, none combine all such features and more for the convenient and effective use of a multi-function pet leash according to aspects of the present invention.

The following art defines the present state of this field:

U.S. Pat. No. 6,024,054 to Matt et al. is directed to a retractable leash that includes an integral light. The apparatus has a first housing section and a retractable leash section. The first housing section has a handle, a light connected to the top front portion of the first housing section, and a receiving area. A rechargeable battery is removably connected to the first housing in the handle. The retractable leash section has a second housing section pivotably mounted to the first housing section, in the receiving area, and a reel rotatably mounted to the second housing section. A leash is connected to the reel for extension and retraction relative to the first housing section. In an alternate embodiment, a light is located on the leash and electrically connected to a conductor extending along the leash.

U.S. Pat. No. 6,240,881 to Edwards et al. is directed to a leash assembly that includes a retractable leash in combination with a pet refuse bag dispenser. The bag dispenser underlies a handle of the leash and includes a lid for permitting access to an inner cavity in which a plurality of bags are disposed. The bag dispenser is either integrally formed with the leash handle, or removably connected to a base of the handle. The plastic bags are disposed within the inner cavity such that the bags may be individually removed through a window provided in a side wall of the bag dispenser. The plastic bags are wound about a tubular axle that has circular flanges at opposite ends such that the roll of bags may rotate within the bag dispenser.

U.S. Pat. No. 6,932,027 to Whitney is directed to a two-piece waist-mounted harness for use in hands free exercising of pets. The two-pieced waist harness includes a back portion which is enlarged and padded and can be placed about a person's waist with a front portion which allows for ease of securement by the use of hook and loop attachment. A nylon strap engages the entire circumference of the first and second portion of the waist harness to prevent disengagement of the harness during use. The waist harness includes multiple attachment loops to allow for carrying of additional items including attachment of multiple pets. A pouch is formed integral to the waist harness for carrying of small items such as pet treats. In addition, a flexible strap is provided for carrying of bottled water. The front portion of the waist harness is securable to a quick release snap mechanism that allows for engagement of multiple tethered pets and for quick disengagement as necessary.

U.S. Patent Application Publication No. US 2006/0027187 to Nicastro is directed to a pet utility belt including at least one compartment configured to receive items related to a dog walk and at least one clip for attachment of an item, such as a dog leash. During operation, the wearer of the belt can quickly put the belt on when he/she is ready to go out. The compartments can be pre-filled with specific items so that no additional time is spent gathering the necessary items for dog walking, such as, treats to reward the dog, bags to pick up the dog's waste, a flashlight for dusk or nighttime walking, especially around dark neighborhoods or parks, mace for possibly defending oneself against stray dogs, an umbrella in case it starts raining or the weather is bad, a wallet to hold money to allow the wearer the ability to buy sundries for themselves or the dog.

U.S. Pat. No. 7,073,462 to Layman is directed to an organizer for assisting a user when taking a dog for a walk. The organizer has an adjustable belt with an interlocking buckle and an attached pouch. The pouch has a top lid and front, left and right surfaces. The lid closes by means of a top zipper. A hook for tethering the dog is permanently affixed to the left surface. The user can insert a box of plastic bags in a bag compartment inside a side zipper in the left surface and dispense the bags through an elongated slot in the front surface to collect dog waste. Also, the pouch has separate compartments for a leash and other accessories. A solar energy panel is located on the lid and is in communication with a light-emitting diode. The diode can either be activated by opening the lid or via a switch mounted onto the right surface.

U.S. Patent Application Publication No. US 2006/0162675 to Ghalebi et al. is directed to an improved pet walking device with their systems and methods. More particularly, a pet walking device is disclosed with a detachable or built in flashlight, an attachable pet waste sack holder, a dynamo for recharging a flashlight, and an improved gear system to be used in connection with a retractable leash.

U.S. Patent Application Publication No. US 2008/0006223 to Sugalski is directed to a leash handle that includes a grip, a mounting post, and a mid-section provided with an integrated storage compartment. The grip is configured for convenient gripping in one hand by a user. The mounting post is configured for connection to the looped end of a strap leash. A manually openable door or wall element provides access to the storage compartment.

U.S. Patent Application Publication No. US 2010/0024741 to Schoppman is directed to a leash allowing a user to design and customize, meeting the needs of the animals and its user. Within the leash are areas that can be connected and disconnected from by means of quick connect/disconnect fasteners, allowing options to be added for continuous use or can be removed when not in use leaving the leash at all times functional. Such options in said system include interchangeable handles, for comfort and enhanced control. Various separate storage compartment options are included for use with transporting a collapsible bowl, water container, toys, animal waste bags and waste, as well as personal items of the user, additional leash extenders and multiple leash connections. The user can also opt for color changes, reflective inserts, or other ornamentation designs, styles or graphics. All these options can be connected directly into the leash, with full or part time use, leaving the leash to remain one continual unit eliminating the need to own several different leashes, if any area or option in said system is damaged or lost by the animal or user it can be replaced quickly and inexpensively without the need to replace the entire leash.

The prior art described above teaches a combined retractable leash and flashlight, a leash assembly having a pet refuse bag dispenser mechanism, a pet utility belt, an organizer for taking dogs for walks, a pet walking device, a leash handle with an integrated compartment, a pet tethering apparatus, and a buddy leash system, but does not teach a multi-function pet leash system wherein a substantially rigid tether and carrier engaged with a handle may have one or more means for removable tethering and carrying of accessories or wherein the handle is removably engaged with the tether and carrier and so may serve a separate function, alone or in combination with one or more of the accessories. Aspects of the present invention fulfill these needs and provide further related advantages as described in the following summary.

SUMMARY OF THE INVENTION

Aspects of the present invention teach certain benefits in construction and use which give rise to the exemplary advantages described below.

A multi-function pet leash system according to aspects of the present invention generally comprises a substantially rigid handle and a substantially rigid tether and carrier engaged with the handle. The tether and carrier may have one or more means for removable tethering and carrying of accessories, whereby with a pet attached to a leash engaged with the tether and carrier, a user may grasp the handle coupled to the leash through the tether and carrier and walk the pet while conveniently carrying one or more accessories. The handle may be disengaged from the tether and carrier and so serve a separate function, alone or in combination with one or more of the accessories.

A primary objective inherent in the above described system and method of use is to provide advantages not taught by the prior art.

Another objective is to provide such a system and method that is customizable to meet a user's various needs and desired experience.

Another objective is to provide such a system and method wherein the handle and the tether and carrier are removably engaged.

Another objective is to provide such a system and method wherein the handle serves a separate function when disengaged from the tether and carrier.

Another objective is to provide such a system and method wherein the tether and carrier has one or more means for removable tethering and carrying of accessories.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

DETAILED DESCRIPTION OF THE INVENTION

The above described drawing figures illustrate aspects of the invention in at least one of its exemplary embodiments, which are further defined in detail in the following description.

Figure 1:
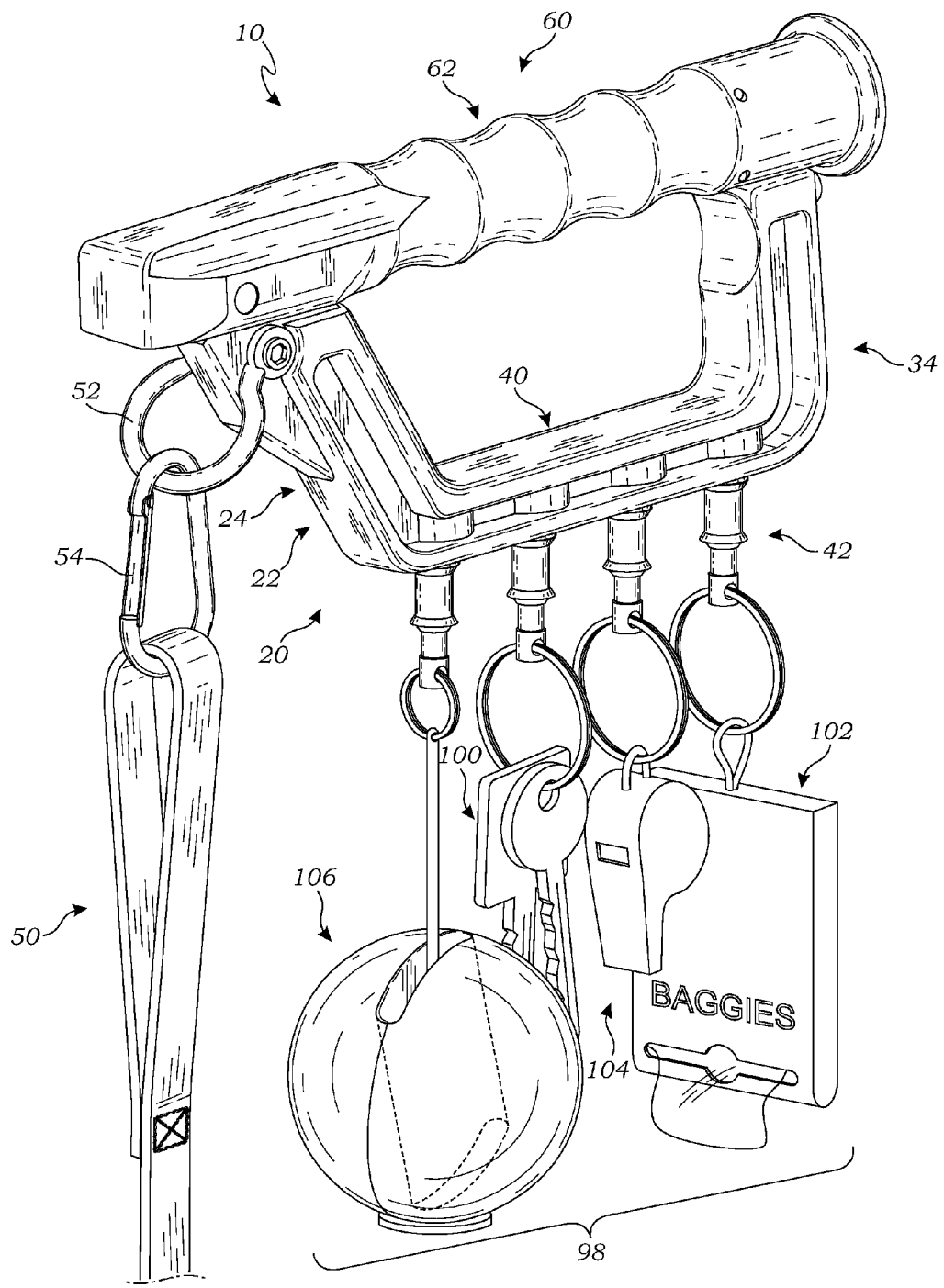
FIG. 1 is a perspective view of an exemplary embodiment of the invention.

Referring first to FIG. 1, the present invention generally relates to a multi-function pet leash system 10 for walking a pet as well as conveniently carrying along other items typically desired on a pet walk, such as, for example, keys, "doggie doo" bags, a whistle, mace, and various toys for play with the pet, depending on the type and length of the outing. In one particular aspect, the leash system 10 includes the removable engagement of a handle 60 with a tether and carrier structure 20 (herein sometimes referred to as a "tether/carrier 20") that incorporates a leash 50, the benefits in construction and use of which will be understood from the following discourse and accompanying drawings. It will be appreciated by those skilled in the art that while specific exemplary embodiments of the leash system 10 are shown and described, the invention is not so limited. Rather, the various components of the leash system 10 can take numerous other forms in appearance and substantially equivalent function without departing from the spirit and scope of the invention.

With continued reference to FIG. 1, the multi-function leash system 10 again includes as its primary two components in the exemplary embodiment a tether/carrier 20 and removably engageable elongate handle 60. The tether/carrier 20 includes a somewhat U-shaped tether/carrier body 22 that has inserted in a front leg 24 thereof a ring 52 for coupling the fixed-length leash 50 as through a latch hook 54 or the like. As shown, the ring 52 is able to pivot slightly on the tether/carrier body 22 through its pinned connection through leash hole 26 (FIG. 3A) and is generally curved from side to side so as to allow for relatively smooth slidable movement of the latch hook 54 thereabout in a substantially horizontal plane, as when a pet being walked veers from side to side relative to the user. It will be appreciated that the tether/carrier body 22 and the ring 52 coupled thereto are to have sufficient mechanical integrity to withstand the forces some pets may place on the leash system 10 while being walked. In an exemplary embodiment, the assembly is configured to withstand tension forces on the order of 300 to 700 pounds, though a variety of mechanical capacities may be designed into the leash system depending on the type of pet and other factors. In an alternative embodiment, not shown, a retractable leash mechanism with index-finger actuation could be installed within the tether/carrier 20 so that the retractable leash cable extends substantially from the front leg 24 of the tether/carrier body 22 in much the same direction and orientation as the fixed-length leash 50 shown. The actuation trigger of the retractable leash mechanism would then ergonomically extend downwardly and inwardly of the front leg 24 of the tether/carrier body 22 within the space bounded by the tether/carrier body 22 and the handle 60 when engaged, such that grasping the grip 62 of the handle 60 naturally places the user's index finger in the vicinity of the actuation trigger. Accordingly, those skilled in the art will appreciate that a variety of leash configurations are possible in conjunction with the tether/carrier 20, such that the present invention is not limited to the exemplary fixed-length leash 50 shown. The tether/carrier body 22 is further formed with a rear leg 34 and a bottom leg 40 interconnecting the front leg 24 and the rear leg 34 and in which is installed one or more removable ring key chain assemblies 42 for the removable tethering and carrying of accessories, generally denoted 98, as illustrated in FIG. 1, such as keys 100, a doggie bag dispenser 102, a whistle 104, and a ball 106, more about which will be said below in connection with FIGS. 3A-3D. It will be appreciated that while four removable ring key chain assemblies 42 are shown in the exemplary embodiment, virtually any number of such assemblies could be included in the tether/carrier 20 as dictated by other design considerations and objectives.

Figure 2:
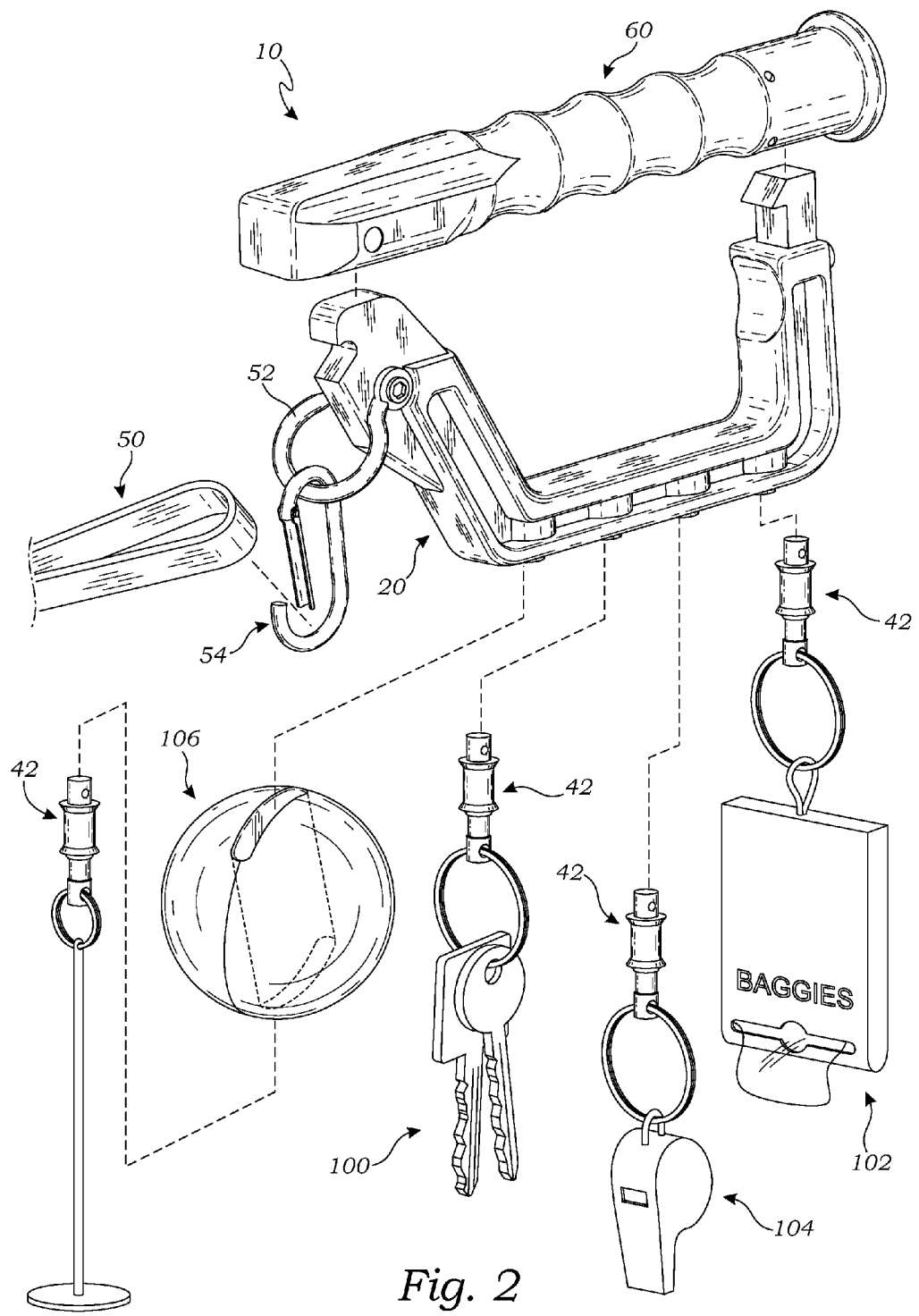
FIG. 2 is an exploded view thereof.

Turning briefly now to FIG. 2, there is shown an exploded perspective view of the exemplary multi-function pet leash system 10 now with the handle 60 disengaged from the tether/carrier 20, the illustrative mechanics of which is discussed further below in connection with FIGS. 3A-3D as well. Regarding the removable ring assemblies 42, there is shown a Model #701278 push-pin assembly manufactured by The Hillman Group in Cincinnati, Ohio. However, it will here be appreciated that a wide variety of hardware and other devices now known or later developed for the temporary or removable attachment to a base, or tethering and carrying of items, may be employed in connection with the present invention, including but not limited to Velcro® hook and loop fasteners, magnets, slotted engagements, hooks and eyes, clips, button snaps, carabineers, anchor shackles, safety pins, screw-type devices, rails and slides, twist ties, etc. Similarly, while a mounted ring 52 and latch hook 54 are shown as effectively mechanically selectively coupling the leash 50 to the tether/carrier 20, those skilled in the art will again appreciate that a variety of other hardware devices and the like, whether now known or later developed, may be employed in coupling a leash 50 to the tether/carrier 20 of the present invention. More generally, it will be appreciated that the substantially rigid tether/carrier 20 and handle 60 may be formed of any suitable material through any suitable process now known or later developed, such as machined or formed metal components or injection molded plastic components, such that each has adequate functional integrity and wear properties for the installation thereon of the other components of the leash system 10 as above described and for the repeated removable engagement of one with the other as described below in connection with FIGS. 3A-3D.

Figure 3A:
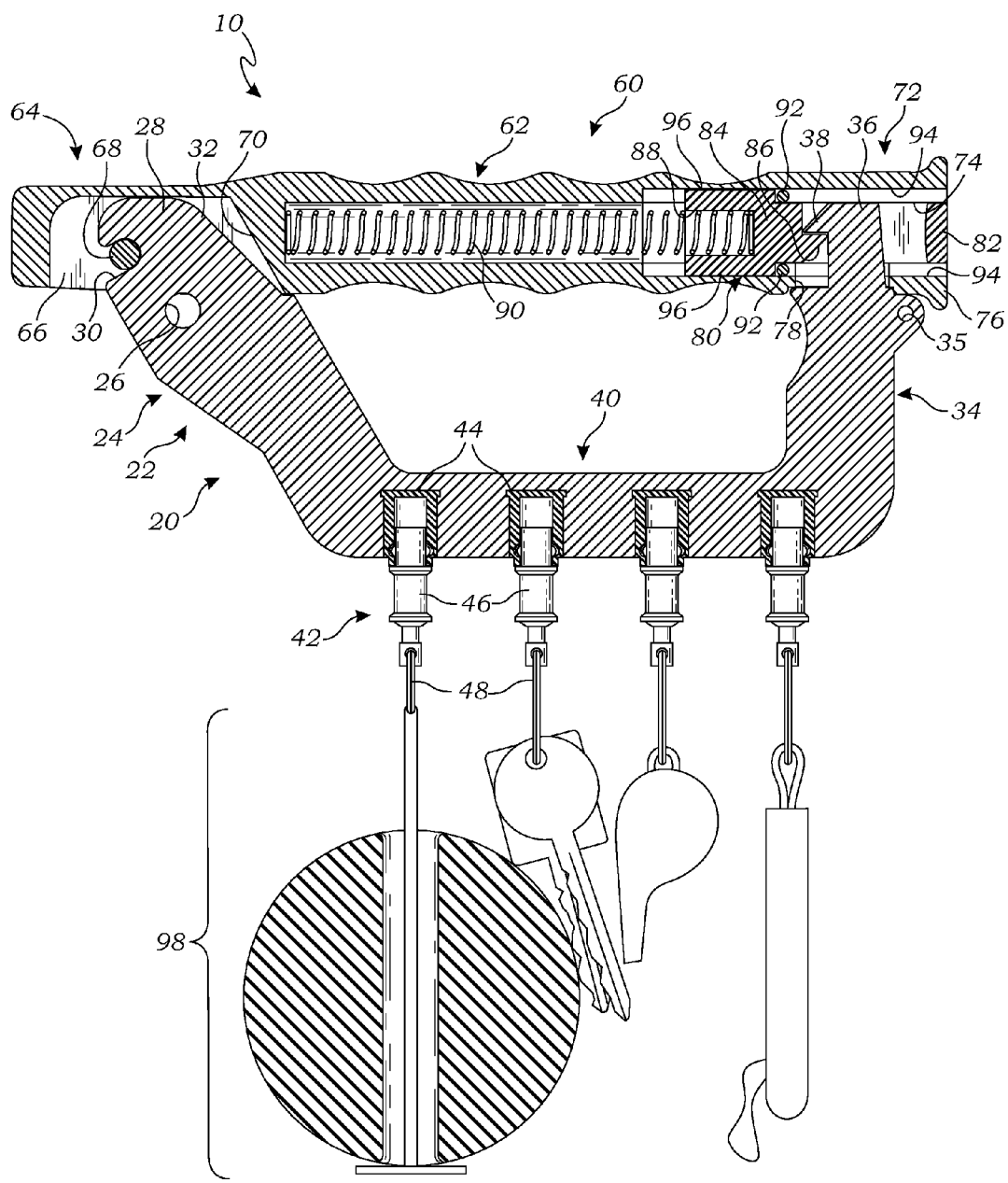
FIGS. 3A-3D are partial cross-sectional views of an exemplary handle and tether and carrier thereof in four illustrative operational positions.

Referring next to the partial cross-sectional views of the leash system 10 of FIGS. 3A-3D, particularly focusing on the mechanical aspects of the engagement of both the handle 60 and the removable coupling assemblies 42 with the tether/carrier 20, there is initially shown in FIG. 3A the leash system 10 in a first operative configuration, as when a pet is to be walked, though for simplicity without showing the leash 50 and the associated ring 52 and latch hook 54 (FIGS. 1 and 2), wherein the tether/carrier 20 is positively engaged with or "clicked into" the handle 60 and the removable coupling assemblies 42 are all in place so as to tether and carry the desired accessories 98 on the walk. With regard to the engagement of the tether/carrier 20 with the handle 60, there is shown at the general front end of the device that the front leg 24 of the tether/carrier body 22 terminates distally in a hook portion 28 sized and shaped to slide within a corresponding downwardly-opening channel 66 formed in a front portion 64 of the handle 60 distal of the central grip portion 62. The hook portion 28 of the tether/carrier body 22's front leg 24 is formed with a forwardly-opening notch 30 configured to engage a cross-pinned keeper post 68 installed within the channel 66. Also in the front leg 24 below the hook portion 28 so as to not be eclipsed by the handle 60 when the tether/carrier 20 is installed therein as shown, a leash hole 26 is formed to accommodate the ring 52 or other such fastener for coupling the fixed-length leash 50 to the tether/carrier 20 as through a latch hook 54 or the like, as shown in FIGS. 1 and 2. On the general back end of the device, the rear leg 34 of the tether/carrier body 22 is shown as terminating distally in a latch portion 36 having formed thereon a distally-projecting finger 38. The rear portion 72 of the handle 60 proximal the grip portion 62 is formed with an axial bore 74 opening at the proximal end wall 76 of the handle 60 and extending some distance into the handle 60, as shown in the exemplary embodiment, substantially within the grip portion 62 of the handle 60 to a location or depth proximal the channel 66 formed in the front portion 64 of the handle 60. A downwardly-opening aperture 78 is also formed in the rear portion 72 of the handle 60 proximal the grip portion 62 so as to intersect the axial bore 74 and allow for the passage therethrough of the latch portion 36 of the rear leg 34 of the tether/carrier body 22. Within the bore 74 there is slidably inserted a latch retainer 80 having a proximal button 82 and an offset latch body 84 terminating proximally in a proximally-projecting finger 86 sized and configured for selective engagement with the distally-projecting finger 38 formed on the latch portion 36 of the rear leg 34 of the tether/carrier body 22. The latch body 84 terminates distally in a latch bore 88 for receipt of a compression spring 90 configured to bias the latch retainer 80 proximally against two pin stops 92 positioned within the axial bore 74 to place the distally- and proximally-projecting fingers 38, 86 in engaging contact in a default or "at rest" operational position or configuration of the leash system 10, whereby the rear leg 34 of the tether/carrier body 22 is retained within the rear portion 72 of the handle 20 while the front leg 24 of the tether/carrier body 22 is itself trapped within the channel 66 formed in the front portion 64 of the handle 60 through the engagement of the keeper post 68 with the notch 30 formed in the hook portion 28 of the front leg 24. As such, those skilled in the art will appreciate that the tether/carrier 20 is thus positively engaged with the handle 60, such that grasping the grip portion 62 of the handle 60 functions to effectively hold the leash 50 (FIG. 1) through its coupling to the handle 60 through the tether/carrier 20. Moreover, in the exemplary embodiment wherein the oppositely projecting and sloped fingers 38, 86 engage to retain the tether/carrier 20 within the handle 60, those skilled in the art will appreciate that the components slide across each other pop into their biased or at rest positions as shown in FIG. 1, they are thus "clicked" together and so the user will hear an audible "click" as further confirmation of the positive engagement between the tether/carrier 20 and the handle 60. It will be further appreciated that the biasing spring 90 and thus the depth of the axial bore 74 formed within the handle 60 may vary as required, as can the diameter of the axial bore 74, so as to allow for other functional uses of portions of the interior space within the handle 20, as further shown and described in connection with the alternative exemplary embodiment of FIG. 4 wherein the handle 20 is configured as a flashlight. Relatedly, it will be appreciated that while a particular configuration of the axial bore 74 is shown as further having at least two lengthwise slots 94 configured for slidable receipt of corresponding radially-outwardly-projecting ribs 96 formed on the latch body 84 so as to orient particularly the proximally-projecting finger 86 relative to the distally-projecting finger 38 formed on the latch portion 36 of the rear leg 34 of the tether/carrier body 22, other mechanical means for operably forming and orienting the latch retainer 80, now known and later developed, may be employed without departing from the spirit and scope of the present invention, such that the embodiments shown and described are to be understood as merely illustrative of aspects of the present invention.

Figure 3B:
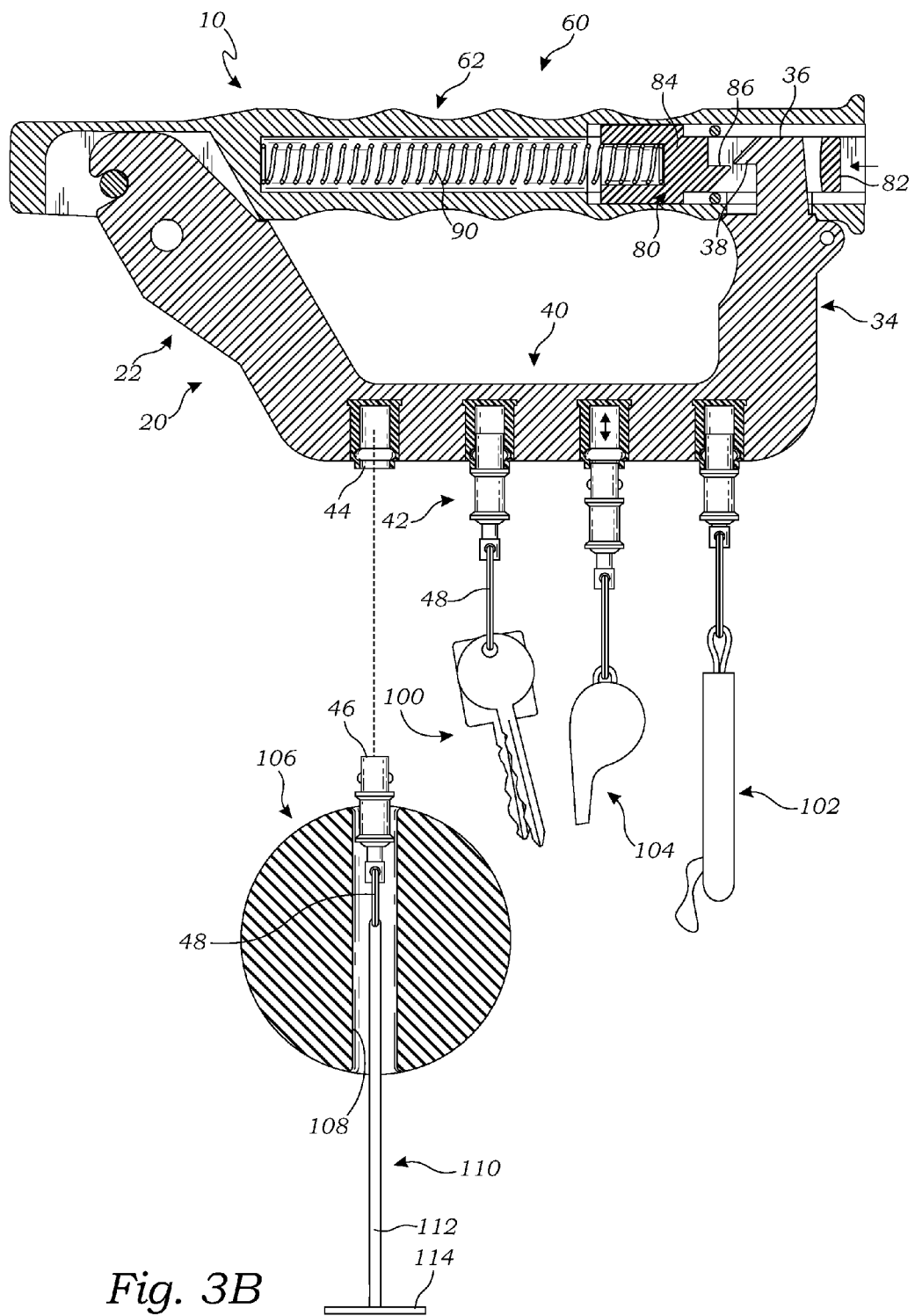
Figure 3C:
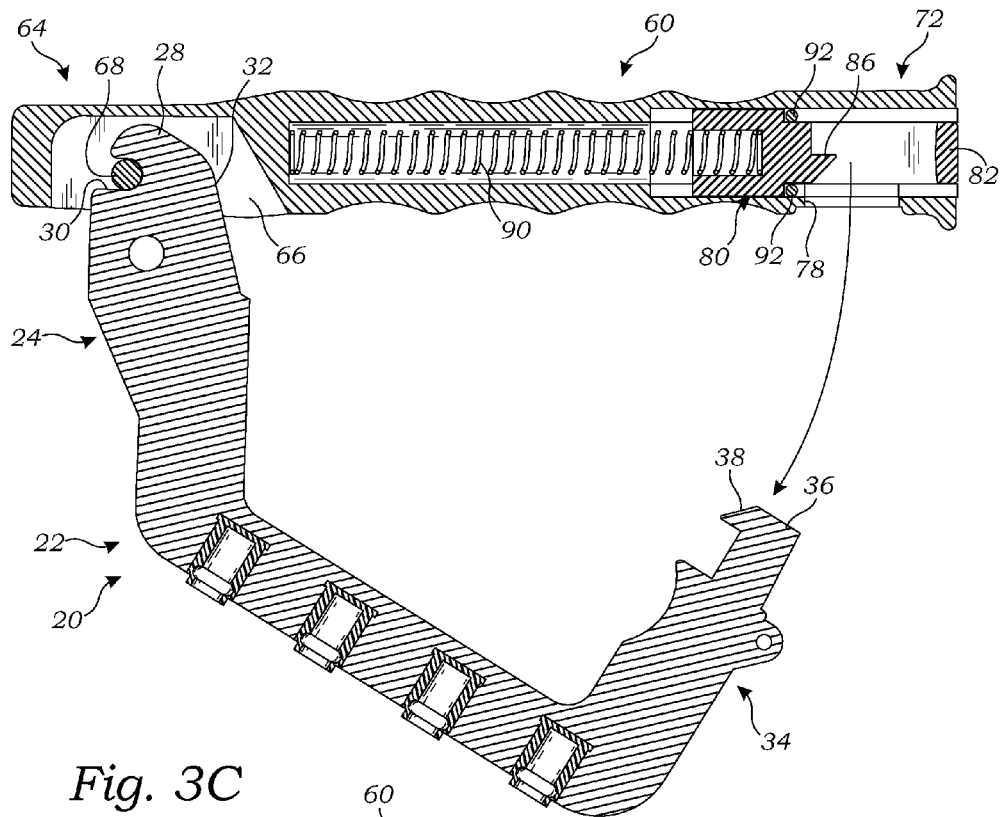
Figure 3D:
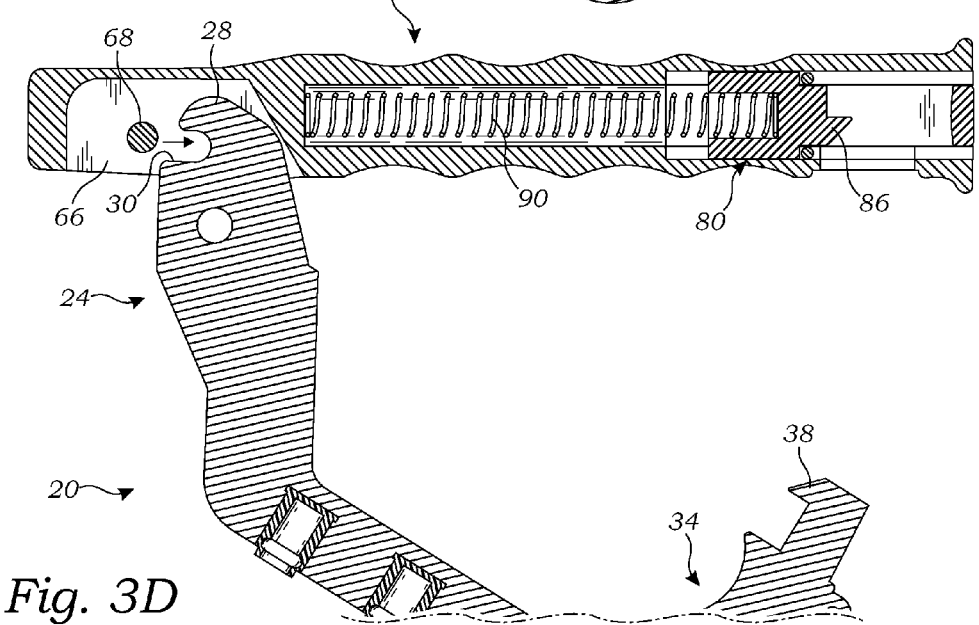
Figure 6:
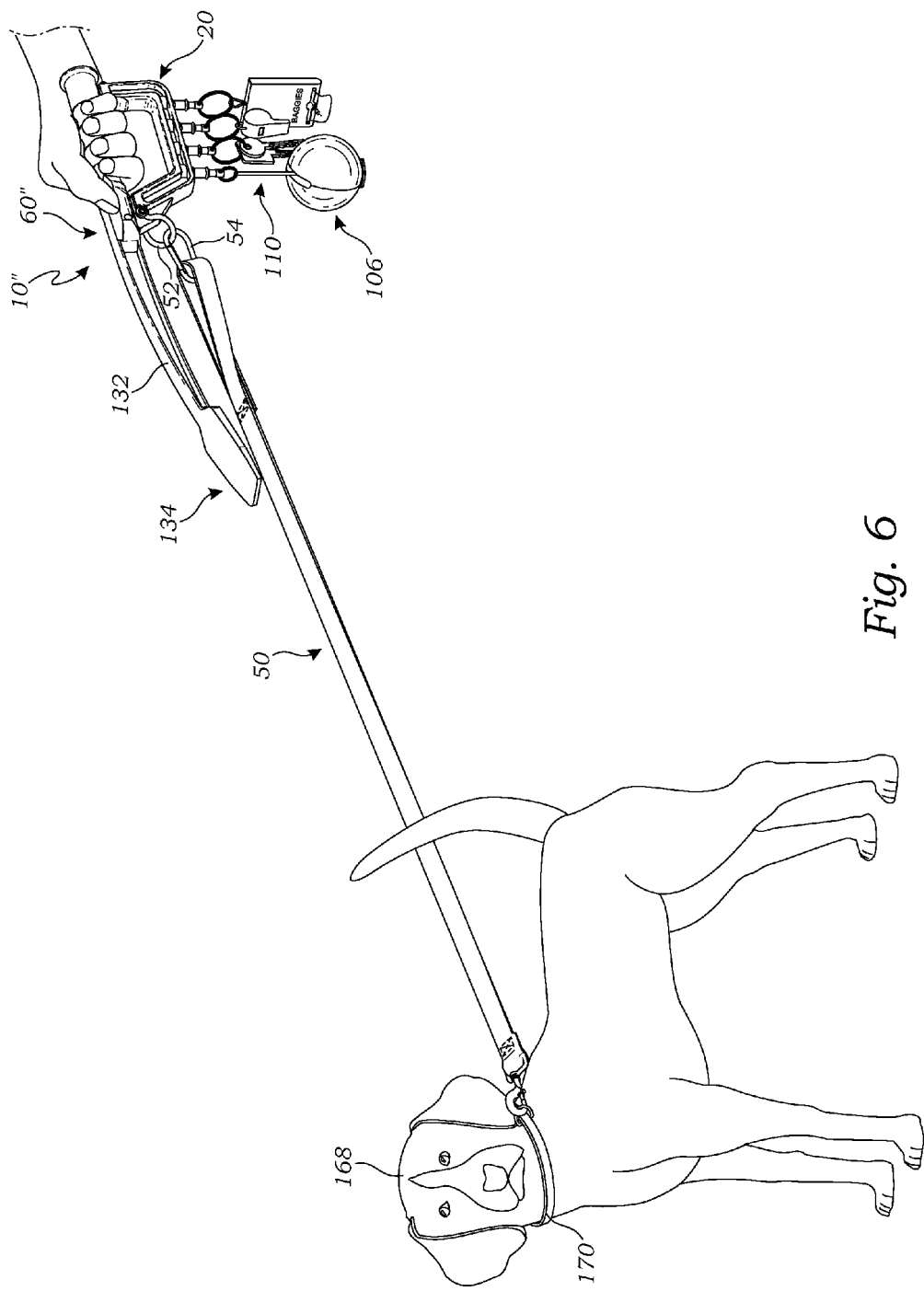
FIG. 6 is a schematic of the alternative exemplary embodiment of FIG. 5 in use in walking a pet.

Turning now to FIGS. 3B-3D, there is shown an operational sequence by which engagement structure is operated so that the tether/carrier 20 may be selectively disengaged from and later reengaged with the handle 60, as when a pet is no longer being walked and the handle 60 is to serve some purpose other than an effective grip 62 for the leash 50 (FIG. 1), more about which is said below in connection with FIGS. 6 and 7 illustrating the leash system 10 of the present invention in one of its exemplary embodiments in use. First, in FIG. 3B, now the button 82 of the latch retainer 80 has been actuated or depressed against the resistance of the biasing compression spring 90 acting through the integral latch body 84 so as to disengage the proximally-projecting finger 86 of the latch retainer 80 from the distally-projecting finger 38 formed on the latch portion 36 of the rear leg 34 of the tether/carrier body 22. Accordingly, as next shown in FIG. 3C, after the latch button 82 has been so actuated and the distally- and proximally-projecting fingers 38, 86 are clear of each other as shown in FIG. 3B, now the latch portion 36 of the rear leg 34 of the tether/carrier body 22 is free to pass through the downwardly-opening aperture 78 formed in the rear portion 72 of the handle 60 as the tether/carrier 20 pivots about the hook portion 28 of the front leg 24 as still retained within the channel 66 formed in the front portion 64 of the handle 60 through the continued engagement of the notch 30 with the channel 66's keeper post 68. It is noted that in this same position with the tether/carrier 20 pivoted relative to the handle 60 such that the latch portion 36 of the rear leg 34 of the tether/carrier body 22 is clear of the rear portion 72 of the handle 60, now release of the button 82 as shown in FIG. 3C allows the spring 90 to return the latch retainer 80 to its proximal position abutting the pin stops 92 and ready for the next "click in" re-engagement of the tether/carrier 20 within the handle 60. Finally in terms of the disengagement sequence, as shown in FIG. 3D, with the tether/carrier 20 so pivoted away from the handle 60, the hook portion 28 of the front leg 24 can be shifted proximally within the channel 66 until the proximal surface 32 (FIGS. 3A and 3C) of the hook portion 28 is in contact with the proximal interior wall 70 (FIG. 3A) of the channel 66, whereby the notch 30 is disengaged from the keeper post 68 and now the tether/carrier 20 can be completely removed from the handle 60 as shown in FIG. 2. It will be appreciated by those skilled in the art that the same movements of the respective components in reverse will effectively re-engage the tether/carrier 20 with the handle 60 as shown in FIGS. 1 and 3A. Specifically, it will be appreciated that the cooperation of the respective sloped surfaces of the distally- and proximally-projecting fingers 38, 86 of the rear leg 34 and the latch retainer 80, respectively, and the biasing action of the spring 90 allow the rear leg 34 of the tether/carrier body 22 to be "clicked" back into the handle 60 as the front leg 24 is pivotally engaged within the channel 66. It will further be appreciated, once more, that other mechanical means now known or later developed for selectively engaging and disengaging the tether/carrier 20 and handle 60 may be employed in the leash system 10 of the present invention without departing from its spirit and scope, such that the features and functions described and shown are to be understood as illustrative of aspects of the present invention.

With reference again to FIG. 3A, the removable coupling assemblies 42 are shown as each having a female receptacle 44 installed within the bottom leg 40 of the tether/carrier body 22 so as to open downwardly therefrom. Each female receptacle 44 may be so installed or integrally formed within the bottom leg 40 using any technique now known or later developed, such as over-molding during an injection mold process, threaded assembly, press-fit, solvent-bonding, welding, etc., and is configured for removable receipt of a corresponding spring-biased male connector 46 in a manner known in the art. As shown, the male connector 46 may, in turn, terminate in a ring 48 or the like to which any accessory can then be attached, again in any manner now known or later developed. Thus, it will once more be appreciated that a number of forms may be taken beyond the exemplary embodiments in removably tethering accessories 98 to the tether/carrier 20 of the leash system 10 of the present invention without departing from its spirit and scope. There is also shown particularly in FIG. 3B the removal of exemplary ones of the coupling assemblies 42 installed within the bottom leg 40 of the tether/carrier body 22. As stated previously, in the exemplary embodiment such coupling assemblies 42 are shown as Model #701278 push-pin assemblies manufactured by The Hillman Group, though again any other removable engagement means now known or later developed may be employed. As illustrated, actuation of the spring-biased male connector 46 in a manner known in the art allows its removal from the female receptacle 44, whereby any item connected to the ring 48 of a particular male connector 46 is thus detached from the tether/carrier 20 for use, such as the illustrated keys 100, a doggie bag dispenser 102, and a whistle 104. With continued reference to FIG. 3B along with FIG. 2, there is also shown the removal from a female receptacle 44 of a male connector 46 having attached thereto instead of only the standard key ring 48, here illustrated as having a relatively smaller diameter, a further T-holder 110 for toys and the like, such as a ball 106, that enables such to be removably tethered to the tether/carrier 20 without a ring, eyelet or other such mechanical attachment means permanently installed on the toy or other object that could potentially disturb or limit the use of the toy once removed from the tether/carrier 20. In this alternative tethering embodiment, then, the T-holder 110 is configured with a vertical T-member 112 configured for passing through an aperture 108 in the ball 106 and having a length that is greater than the length of the aperture 108, or the diameter of the ball 106, and is further configured at the distal end thereof, or the end of the vertical T-member 112 opposite the male connector 46, with an integral horizontal T-member 114 having a profile greater than the diameter of the aperture 108 so as to retain the ball 106 on the T-holder 110 when the male connector 46 is passed through the aperture 108 and engaged with the corresponding female receptacle 44. Accordingly, a toy such as a ball 106 can be removably attached to the tether/carrier 20 without itself having a loop or other mechanical means for fastening the ball 106 directly to the ring 48, the advantage of which will be made readily apparent particularly through the below discussion in connection with FIGS. 7A-7B. For simplicity, in FIGS. 3C and 3D all the male connectors 46 and respective tethered objects have been removed. It will be appreciated that according to aspects of the present invention one or more objects are easily and conveniently removably tethered to the tether/carrier 20 of the leash system 10 so as to port any such objects as desired for a pet walk or the like.

Figure 4:
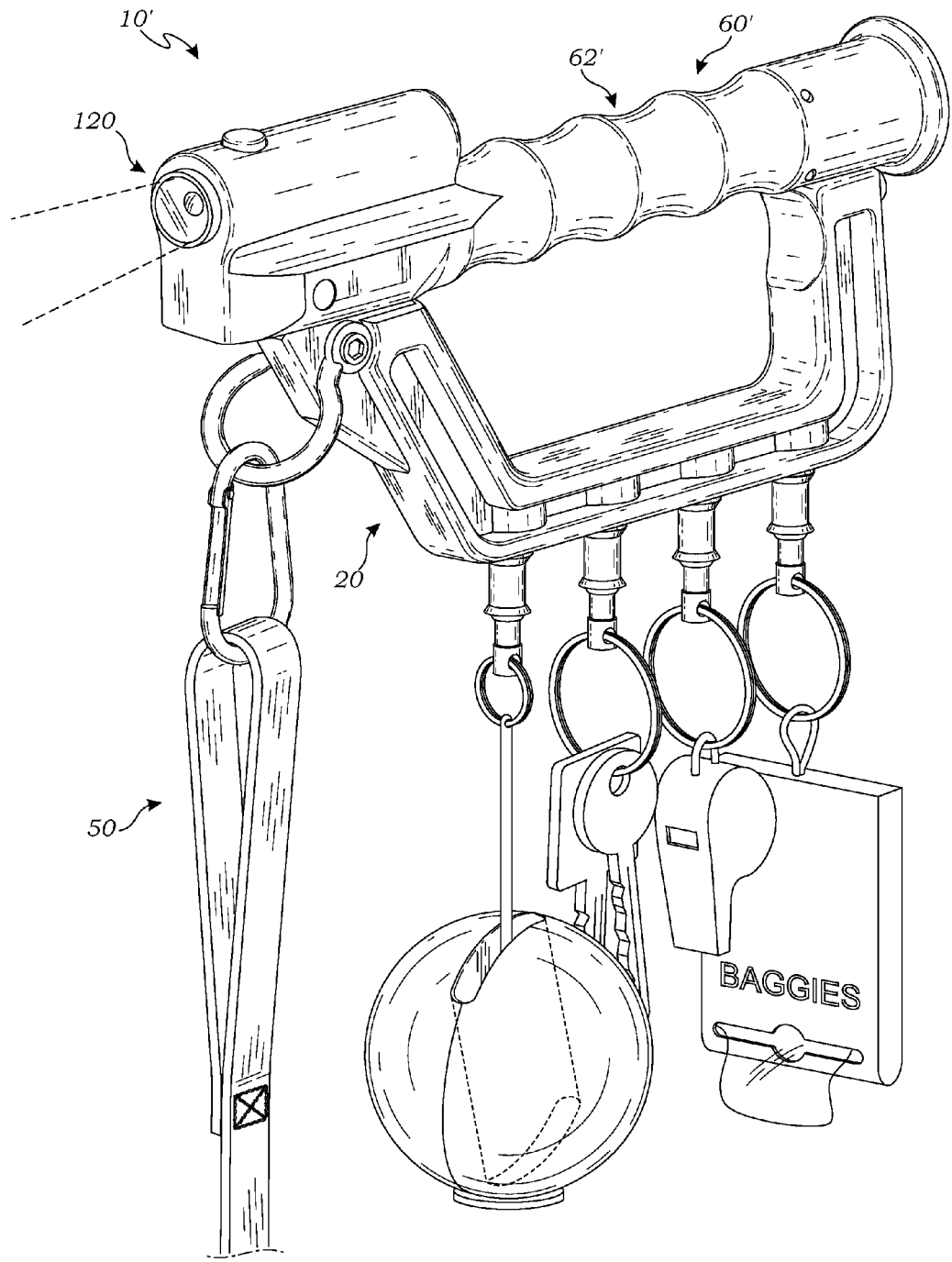
FIG. 4 is a perspective view thereof including an alternative handle configured as a flashlight.

Referring next to FIG. 4, there is shown a perspective view of a first alternative leash system 10' wherein the handle 60' is configured as a flashlight. As shown, the tether/carrier 20 is in this embodiment unchanged from the prior illustrative embodiment of FIG. 1, such that even the "click-in" mechanical coupling of the flashlight handle 60' with the tether/carrier 20 would be in this exemplary embodiment essentially the same as shown and described particularly in connection with FIGS. 3A-3D. However, the width, or diameter, of the handle 60' would likely be increased over the standard handle 60 (FIG. 1) along at least a portion of its length both to accommodate the bulb and reflector assembly 120 and to house the batteries (not shown) while still leaving room for the coupling mechanisms of the tether/carrier 20. Such a flashlight assembly may be incorporated into the handle 60' essentially above and distal of the grip portion 62' as shown or axially along the grip portion 62', wherein to accommodate one or more batteries, particularly, a modified spring (not shown) relatively shorter in length while still having the necessary biasing force against the latch retainer 80 (FIGS. 3A-3D) may be incorporated. In either case, such a flashlight handle 60' would also still have an ergonomic grip portion 62' both for use of the handle 60' as a flashlight and for gripping the leash 50 through the coupling of the tether/carrier 20 with the handle 60' as described above, wherein the grip portion 62' may be slightly longer or shorter or larger in circumference to accommodate additional internal components within the handle 60'. In a further alternative embodiment, the spring-biased latch mechanism can be moved out of the handle 60' entirely and into the tether/carrier 20, effectively reversing the mechanical components for the selective engagement of the tether/carrier 20 with the handle 60', whereby particularly alternative handle configurations/uses as illustrated herein may be accommodated. It will be appreciated by those skilled in the art that numerous other such functional handles 60' may be incorporated in the leash system 10' of the present invention without departing from its spirit and scope, including but not limited to other lights such as blinking or night safety lights or a glowstick, a water bottle, or a protective stick. Moreover, it will be appreciated once more that other means for removable engagement of such functional items within the leash system 10 of the present invention may be employed. For example, in a further alternative embodiment, the tether/carrier 20 and basic handle 60 much like shown in FIGS. 1-3D may be integrally formed as one unit, with a hole or other engagement means formed at the distal end of the handle 60 so as to removably accommodate a further accessory to be taken along for the walk, such as a flashlight generally aimed in the direction of the leash 50 and pet 168 or an object-throwing apparatus that can be removed from the integral tether/carrier-handle and used separately during playtime as described below in connection with FIGS. 7A-B. Or, in a more basic configuration, the tether/carrier 20 and the basic handle 60 may simply be formed as an integral unit with no removability and separate functionality of the handle, but with the tether/carrier 20 still being formed to detachably port one or more accessories as shown and described herein. A variety of combinations of such features and functionality are thus possible in the leash system of the present invention. Therefore, those skilled in the art will appreciate that the selective removable engagement and configuration of the tether/carrier 20 and the handle 60 may be achieved in a variety of ways without departing from the spirit and scope of the present invention.

Figure 5:
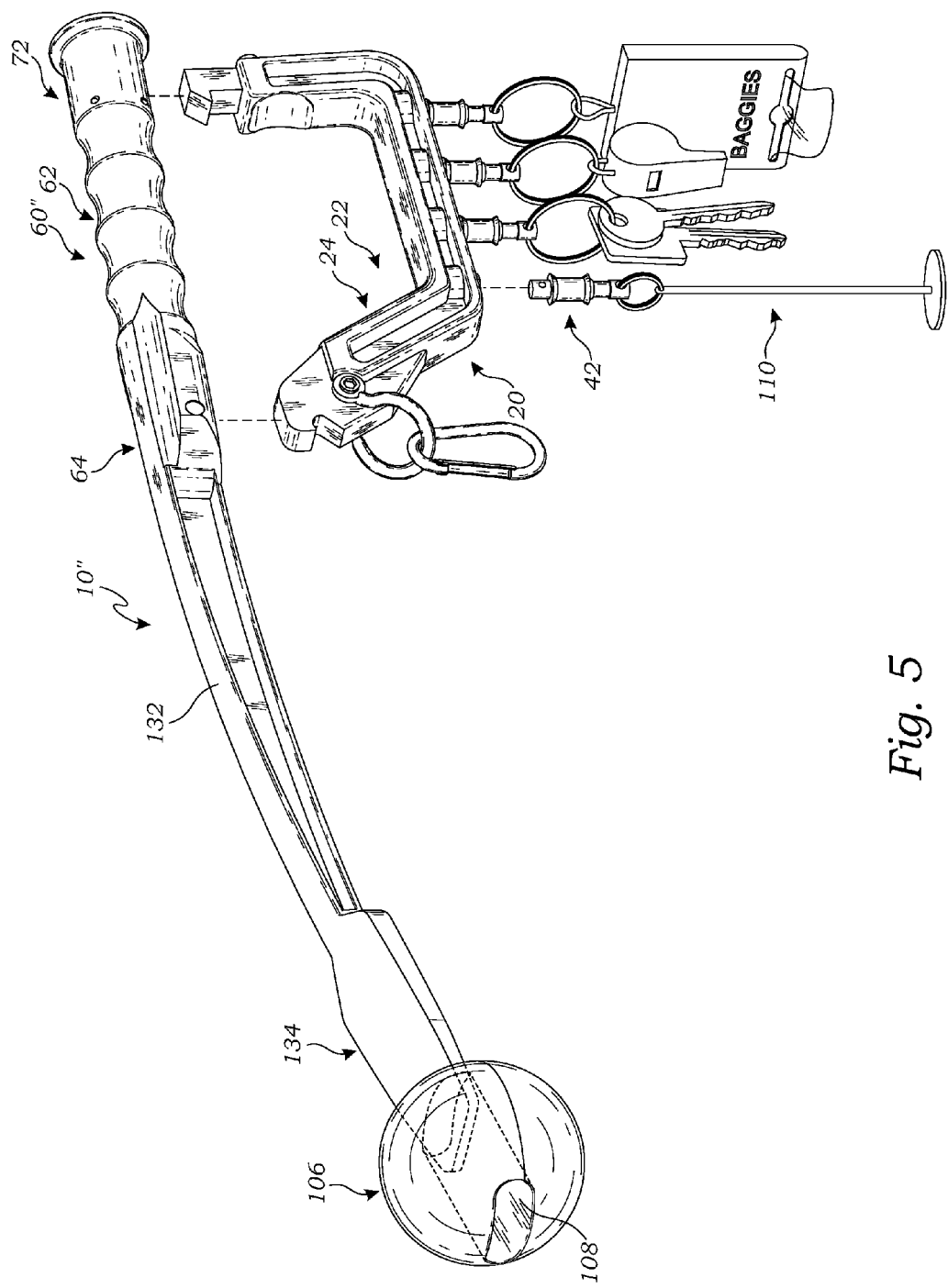
FIG. 5 is a reduced scale partial exploded perspective view thereof including a further alternative handle configured as an object throwing apparatus.

Now turning to FIG. 5, there is shown a partial exploded perspective view of a second alternative leash system 10" wherein the handle 60" is configured as an object-throwing apparatus. Specifically, the alternative handle 60" is formed at its proximal end essentially in all respects as in the previous embodiments, including the grip portion 62 and the front and rear portions 64 and 72, respectively, configured for removable engagement with the tether/carrier 20 as above-described and illustrated. However, now the handle 60" terminates distally not in a blunt end substantially coterminous with the front leg 24 of the tether/carrier body 22, but instead in a distally-extending shank 132 itself terminating in a somewhat wedge- or paddle-shaped engagement portion 134. In the illustrative partial exploded view shown, the handle 60" is detached from the tether/carrier 20 so as to be used independent of the leash system, the removable coupling assembly 42 containing the T-holder 110 is detached from the tether/carrier body 22, and the ball 106 so removed from the T-holder 110 is shown being placed onto the distal end of the handle 60" as through the insertion of the engagement portion 134 within the aperture 108 of the ball 106, more about which in use will be said below in connection with FIGS. 7A and 7B.

Referring next to FIG. 6, in use with the components of the alternative leash system 10" shown in FIG. 5 now all engaged, particularly the tether/carrier 20 with the handle 60" and the ball 106 held on the T-holder 110, as when taking a dog or other pet 168 for a walk and porting the desired accessories 98 (FIG. 1) for the outing, the pet 168 is leashed in the conventional fashion by clipping the free end of a fixed length leash 50 to the pet's collar 170, while the opposite end of the leash 50 is attached to the tether/carrier 20 as through a hook latch 54 or other linkage mechanically coupled to the ring 52 installed in the tether/carrier body 22 (FIG. 5). A user 138 (FIGS. 7A and 7B) then simply grasps the grip 62 (FIG. 5) of the handle 60" to walk the pet 168. It is noted that even in the illustrative embodiment of FIGS. 5 and 6 with the handle 60" terminating distally in the object throwing apparatus having a distally-extending shank 132 and engagement portion 134, and with the above-described accessories 98 (FIG. 1) being ported by the tether/carrier 20, here the exemplary ball 106, keys 100, doggie bag dispenser 102, and whistle 104 (all best shown in FIG. 1), there is no interference with the otherwise conventional gripping of the leash handle 60" and walking of the pet 168 even with tension on the leash 50.

Figure 7A:
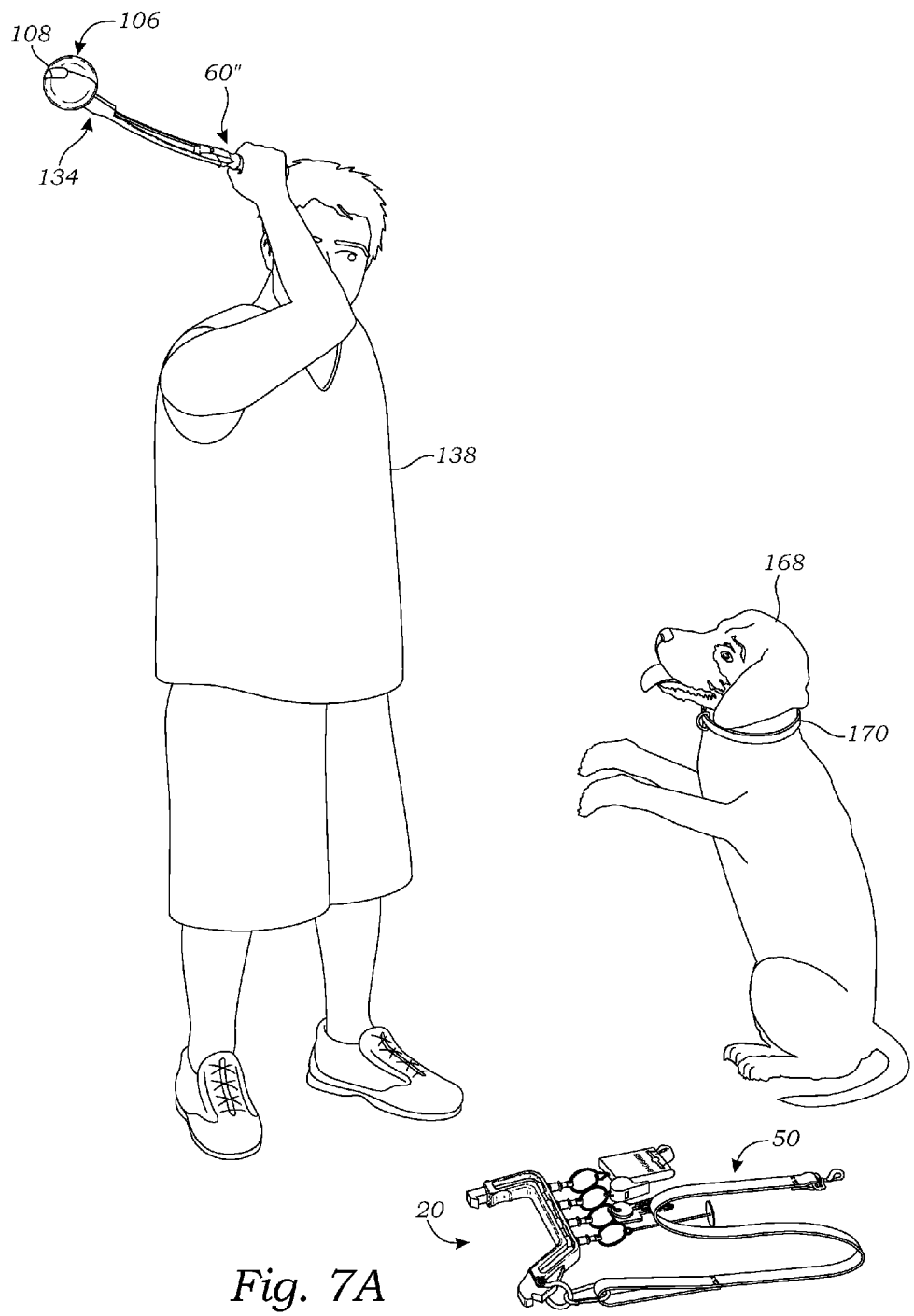
FIGS. 7A-7B are schematics of the alternative exemplary embodiment of FIG. 5 in use in playing with a pet.
Figure 7B:
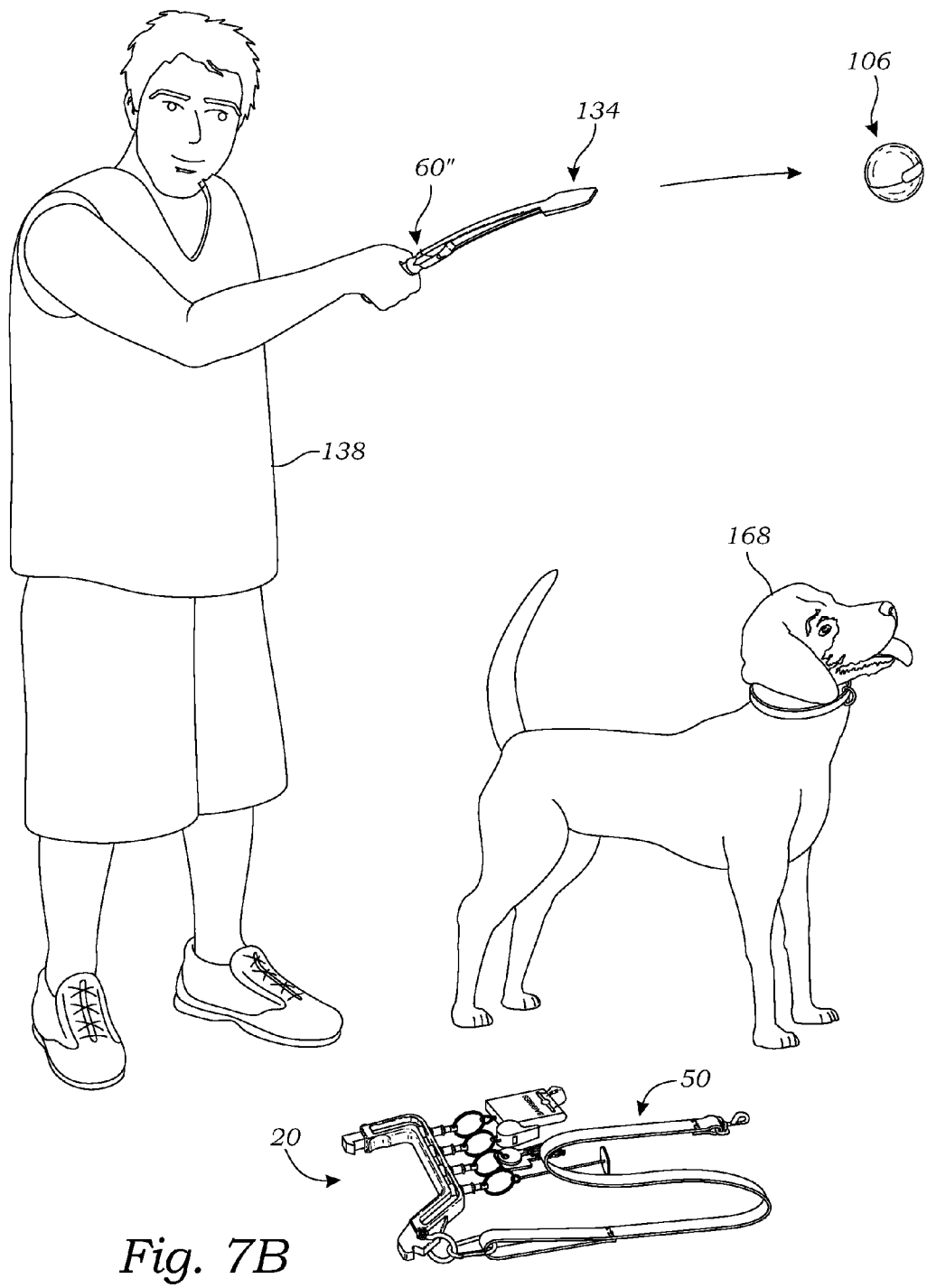

Turning now to FIGS. 7A and 7B, and with continued reference to FIGS. 5 and 6, once the user 138 has arrived at a destination and desires to take his pet 168 off leash for playtime, the leash 50 is simply unclipped from the dog's collar 170, the ball 106 is removed from the T-holder 110 as described previously, and the tether/carrier 20 is removed from the handle 60" as described above in connection with FIGS. 3A-3D and set aside. Now the engagement portion 134 of the handle 60" may be inserted within the aperture 108 of the ball 106 and the ball flung with a relatively typical overhand throwing motion. The advantages of such a throwing apparatus in terms of the ease of use and the desirability of not having to touch a ball or other such toy that has been in a pet's mouth will be appreciated. It will be further appreciated that the leash system 10" of the present invention conveniently and advantageously enables a user 138 to carry accessories 98 (FIG. 1) desired for a particular outing, easily detach the accessories 98 as needed, and even configure the handle 60" of the leash system 10" to not only be detachable from the tether/carrier 20 and, accordingly, the unneeded accessories 98 at that moment, but to itself be configured to double as an object-throwing apparatus for use apart from the leash during play time or, as shown above in FIG. 4, as a flashlight or other functional device useful during or before or after a walk. As such, those skilled in the art will appreciate that the multifunction pet leash system 10 of the present invention has a number of unique and desirable functional benefits in use. By way of further example, it will be appreciated that a single tether/carrier 20 can be used interchangeably with a variety of handles 60 depending on the type of outing, thereby enabling a user to eliminate the expense of multiple entire leash systems while having the versatility of multiple leashes and particularly leash handles, again depending on the type and length of outing the user desires to take his pet on. For example, for a quick outing such as for a little exercise and a potty break, a standard leash system 10 and handle 60 as shown in FIGS. 1-3D may be used, for night-time walks the alternative flashlight handle 60' as shown in FIG. 4 could be used, and for a longer outing with a dog or other pet that enjoys fetch, the alternative object throwing handle 60″ as shown in FIG. 5 may instead be used, all with the same tether/carrier 20. And by having a single tether/carrier 20, there is the further advantage and convenience of consistently having the desired objects tethered thereto that would be needed for most any outing, such as keys and doggie bags, thereby eliminating the need for the user to round up such objects before every walk. Once home, the entire leash system 10, including tether/carrier 20 and handles 60 can be stored in a convenient location with all accessories and other items regularly taken along for the pet walks and longer outings remaining together and in one place—no more early morning, bleary-eyed fumbling around for what is needed to get the eager pet out the door. Specifically, as one further exemplary feature beneficial in both using and storing the leash system 10, as best shown in FIG. 3A, the rear leg 34 of the tether/carrier body 22 may be formed with a strap hole 35 through which a strap (not shown) may be passed and secured in a conventional fashion, which strap could be placed around the user's wrist during use as a further safety feature in case the user's grip on the handle 60 were to slip and would also serve as a convenient way to hang the leash system 10 when not in use. It will be appreciated that such a strap hole 35 and strap could be configured on virtually any part of the leash system 10 using any means now known or later developed, such that the particular location of the strap hole 35 is to be understood as merely exemplary. Thus, the present invention entails a convenient and easy-to-use multi-function pet leash system 10 that is unique in a number of respects as described herein.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A pet leash system comprising:
    a handle having a first portion and a second portion with a grip extending therebetween sized for grasping by a user;
    a tether and carrier structure removably attachable to said handle, said tether and carrier structure having a front leg and a rear leg spaced from said front leg with an interconnecting leg attached to and extending between said front leg and said rear leg and positionable relative to said handle to define an opening sized to receive the fingers of said user between said handle and said tether and carrier structure when said tether and carrier structure is attached to said handle;
    tethering means for removable tethering of accessories to said tether and carrier structure, said tethering means being mechanically associated with said tether and carrier structure;
    engagement structure operable to lockingly engage and disengage said front leg directly with and from said first portion and to lockingly engage and disengage said rear leg directly with and from said second portion through an actuatable latch assembly while said user is grasping said grip; and
    a leash having one end for removable attachment to one of said handle and said tether and carrier structure and a distal end configured for attachment to a pet.

2. The system of claim 1 wherein said engagement structure includes front leg connecting structure on said distal end of said front leg and front portion connecting structure at said first portion of said handle, said front portion connecting structure and said front leg connecting structure being configured for removable engagement therebetween; and
    wherein said engagement structure includes a rear leg connecting structure on said distal end of said rear leg and rear portion connecting structure at said second portion of said handle, said rear leg connecting structure and said rear portion connecting structure being configured for removable engagement therebetween.

3. The system of claim 2 wherein said first portion of said handle has a front portion opening formed therein;
    wherein said second portion of said handle has a rear portion opening formed therein;
    wherein said front leg connecting structure includes a hook portion configured to slide within said front portion opening; and
    wherein said rear leg connecting structure includes a latch portion configured to insert into said rear portion opening.

4. The system of claim 3
    wherein said handle has a handle axis extending through said first portion and said second portion,
    wherein said handle has an axial bore extending along said handle axis;
    wherein a latch retainer is slideably positioned in said axial bore, said latch retainer being movable between an engaged position in which it engages said latch portion of said rear leg to hold said latch portion in said rear portion opening and a disengaged position in which it disengages from said latch portion;
    wherein said front portion opening includes a latch structure; and
    wherein said hook portion has a notch sized and positioned to engage said latch structure to engage said front leg of said tether and carrier structure with said handle.

5. The system of claim 4
    wherein said latch retainer has a distally-projecting finger;
    wherein said latch portion of said rear leg connecting structure is sized to engage said projecting finger when in said engaged position;
    wherein said axial bore includes biasing means to urge said latch retainer to an engaged position to engage said latch portion of said rear leg, said biasing means being compressible for movement of said latch retainer to a disconnecting position in which the projecting finger is disengaged from said latch portion; and
    wherein said axial bore includes a proximal button positioned for movement by the user to urge said latch retainer from said engaged position to said disengaged position.

6. The system of claim 4 wherein said latch retainer has at least one rib extending away therefrom, and wherein the axial bore has at least one groove formed therein for slidable receipt of said at least one rib.

7. The system of claim 3 wherein said handle has an axis extending between said first portion and said second portion and wherein said handle has an axial bore extending along said axis with a latch retainer slideably positioned therein, said latch retainer being movable between an engaged position in which it engages said rear portion connecting structure in said rear portion opening and a disengaged position in which it disengages from rear portion connecting structure.

8. The system of claim 2 wherein said at least one tethering means includes an aperture formed in said bottom leg and a body having at one end a male connector removably insertable into said aperture and connectable thereto and at the other end structure for removable connection with and terminating in an accessory.

9. The system of claim 8 wherein said other end structure of said body of said at least one tethering means is a ring; and wherein said at least one tethering means includes a T-holder connectable to said ring.

10. The system of claim 1 wherein the tethering means is selected from the group consisting of a removable ring assembly, hook and loop fasteners, magnets, slotted engagements, hooks and eyes, clips, button snaps, carabineers, anchor shackles, safety pins, screw-type devices, rails and slides, and twist ties.

11. A pet leash system comprising:
a handle sized for grasping by a user, said handle having a first portion and a second portion with a grip extending therebetween, said grip having a single exterior surface;
a tether and carrier structure formed with a first leg spaced from a second leg substantially in the shape of a 'U';
engagement structure mechanically associated with said handle and said tether and carrier structure, said engagement structure having a first structure operable to engage and disengage said first leg with said first portion of said handle to and from said tether and carrier structure and having a second structure operable to engage and disengage said second leg with said second portion of said handle to and from said tether and carrier structure; and
a plurality of tethering means for associating accessories to said tether and carrier structure, at least one of said tethering means including a receptacle formed in said tether and carrier structure and a male body sized to fit into said receptacle, said body including a ball detent structure sized for removably securing said body to said tether and carrier structure and said body having a ring connected thereto for selective attachment of an accessory thereto.

12. A pet leash system comprising:
a handle including a grip sized for grasping by the user, said grip having a front portion and a rear portion;
a tether and carrier structure having at least one tethering means for removable tethering of accessories to said tether and carrier structure, said tether and carrier structure including a bottom leg having a first end and a second end with a front leg connected to said first end to extend away therefrom to a distal end and a rear leg connected to said second end to extend away therefrom to a distal end;
engagement structure mechanically associated with said handle and said tether and carrier structure, said engagement structure being operable to engage and disengage said handle with said tether and carrier structure, said engagement structure including front leg connecting structure on said distal end of said front leg and front portion connecting structure on said front portion, said front portion connecting structure and said front leg connecting structure being configured for removable engagement therebetween, and said engagement structure including a rear leg connecting structure on said distal end of said rear leg and rear portion connecting structure on said rear portion, said rear leg connecting structure and said rear portion connecting structure being configured for removable engagement and disengagement therebetween, said front leg connecting structure including a hook portion configured to slide within a corresponding downwardly-opening channel formed in the front portion and said rear leg connecting portion including a latch portion configured to pass through an aperature formed in the rear portion of the handle, and said grip, said rear leg, said front leg, and said bottom leg being sized and positioned to form an opening sized to receive the fingers of a user grasping said grip; and
a leash structure for attachment to an animal, said leash structure being mechanically associated with one of said handle and said tether and carrier structure.

13. A pet leash system comprising:
a handle, said handle including a grip sized for grasping by the hand of user, said grip having a front portion and a rear portion, said front portion having a front portion opening formed therein and said rear portion having a rear portion opening formed therein;
a tether and carrier structure, said tether and carrier structure including a bottom leg having a first end and a second end with a front leg connected to said first end to extend away therefrom to a distal end and a rear leg connected to said second end to extend away therefrom to a distal end, said tether and carrier structure having at least one tethering means for removable tethering of accessories to said tether and carrier structure;
engagement structure mechanically associated with said handle and said tether and carrier structure, said engagement structure being operable to engage and disengage said handle with and from said tether and carrier structure, said engagement structure including a front leg connecting structure on said distal end of said front leg and front portion connecting structure on said front portion of said handle, said front leg connecting structure including a hook portion configured to slide within said front portion of said handle, said front portion connecting structure and said front leg connecting structure being configured for removable engagement therebetween, and said engagement structure including a rear leg connecting structure on said distal end of said rear leg and rear portion connecting structure on said rear portion of said handle, said rear leg connecting structure including a latch portion configured to insert into said rear portion of said handle, said rear leg connecting structure and said rear portion connecting structure being configured for removable engagement therebetween;
an opening to receive the fingers of a users defined by said grip, said rear leg, said front leg, and said bottom leg; and
a leash having one end for removable attachment to one of said handle and said tether and carrier and a distal end configured for attachment to a pet.

* * * * *

UNITED STATES PATENT AND TRADEMARK OFFICE
CERTIFICATE OF CORRECTION

| | | |
|---|---|---|
| PATENT NO. | : 9,010,279 B1 | Page 1 of 1 |
| APPLICATION NO. | : 12/871609 | |
| DATED | : April 21, 2015 | |
| INVENTOR(S) | : Saber et al. | |

It is certified that error appears in the above-identified patent and that said Letters Patent is hereby corrected as shown below:

On the title page, item (56) References Cited:

Add:   --D660,384   05/2012   Saber et al.   D21/707--

--D658,243   04/2012   Saber et al.   D21/713--

Signed and Sealed this
Ninth Day of August, 2016

Michelle K. Lee
*Director of the United States Patent and Trademark Office*